(12) United States Patent
Yamaki et al.

(10) Patent No.: US 9,657,851 B2
(45) Date of Patent: May 23, 2017

(54) SPOOL SWITCHING VALVE DEVICE

(71) Applicant: NIDEC TOSOK CORPORATION, Zama, Kanagawa (JP)

(72) Inventors: Yoshinori Yamaki, Zama (JP); Kenji Oohara, Zama (JP); Yasuaki Konagaya, Zama (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 0 days.

(21) Appl. No.: 14/995,500

(22) Filed: Jan. 14, 2016

(65) Prior Publication Data

US 2016/0208937 A1  Jul. 21, 2016

(30) Foreign Application Priority Data

Jan. 19, 2015  (JP) ................. 2015-007899

(51) Int. Cl.
*F16K 11/056* (2006.01)
*F16K 11/07* (2006.01)
(Continued)

(52) U.S. Cl.
CPC ........ *F16K 11/0716* (2013.01); *F16K 11/056* (2013.01); *F16K 11/105* (2013.01);
(Continued)

(58) Field of Classification Search
CPC .......... F16K 1/14; F16K 11/04; F16K 11/044; F16K 11/048; F16K 11/056; F16K 11/10;
(Continued)

(56) References Cited

U.S. PATENT DOCUMENTS 1,409,116 A * 3/1922 Sammis ................ F16K 15/042
137/513
1,675,231 A * 6/1928 Stoke ........................ F04F 1/06
137/112
(Continued)

FOREIGN PATENT DOCUMENTS

JP          S6338775 A    2/1988
JP       2007526968 A    9/2007

*Primary Examiner* — Kevin Murphy
*Assistant Examiner* — David Colon Morales
(74) *Attorney, Agent, or Firm* — Cantor Colburn LLP

(57) ABSTRACT

A spool switching valve device may include a columnar spool housing and spherical valve bodies. The spool housing includes first input port cavity portions, valve body movable portions and valve seat members. Each valve seat member has a through hole and includes a second input port portion. A second valve seat portion is provided to open and close the gap between valve body movable portion and the second input port portion. Each valve body movable portion includes an output port penetrating the side surface of the spool housing to communicate with the outside of the spool. Each valve seat mounting portion includes an engagement receiving portion suppressing the detachment of the valve seat members when the valve seat member is actually mounted. Each valve seat member includes an engagement portion fitted into the engagement receiving portion when the valve seat member is mounted to the valve seat mounting portion.

10 Claims, 6 Drawing Sheets

(51) Int. Cl.
*F16K 11/10* (2006.01)
*F16K 15/04* (2006.01)

(52) U.S. Cl.
CPC ....... *F16K 15/042* (2013.01); *Y10T 137/2564* (2015.04); *Y10T 137/2567* (2015.04); *Y10T 137/2569* (2015.04)

(58) Field of Classification Search
CPC ...... F16K 11/105; F16K 15/04; F16K 15/042; Y10T 137/7838; Y10T 137/7866; Y10T 137/7867; Y10T 137/86815; Y10T 137/87571; Y10T 137/87153; Y10T 137/2564; Y10T 137/2567; Y10T 137/2569
See application file for complete search history.

(56) References Cited

U.S. PATENT DOCUMENTS

| | | | | |
|---|---|---|---|---|
| 2,237,014 A * | 4/1941 | Stoehrer | ............... | B08B 9/0321 137/112 |
| 2,408,799 A * | 10/1946 | Melichar | ................ | F15B 13/02 137/113 |
| 2,501,755 A * | 3/1950 | Bent | ................ | B60T 13/581 137/113 |
| 2,627,388 A * | 2/1953 | Johnson | ................ | F16K 11/056 137/112 |
| 2,778,316 A * | 1/1957 | Haight | ................ | F04C 14/04 137/112 |
| 3,008,482 A * | 11/1961 | Hunter | ................ | F16K 11/056 137/113 |
| 3,447,556 A * | 6/1969 | Howeth | ................ | F15B 11/17 137/112 |
| 3,532,103 A * | 10/1970 | Herrstrum | ............... | F15B 13/04 137/106 |
| 3,552,437 A * | 1/1971 | Blosser, Jr. | ........... | F16K 11/056 137/625.4 |
| 3,805,825 A * | 4/1974 | Lovingham | ........... | F16K 11/105 137/512 |
| 3,900,230 A * | 8/1975 | Durling | ................ | B60T 11/326 128/205.15 |
| 3,945,784 A * | 3/1976 | Collins | ............... | B29C 45/1604 425/130 |
| 3,972,343 A * | 8/1976 | Burge | .................... | F15B 13/02 137/112 |
| 4,401,100 A * | 8/1983 | Slater | ................. | F24D 17/0021 126/362.1 |
| 4,438,778 A * | 3/1984 | Spencer | ................ | F16K 11/056 137/112 |
| 4,463,775 A * | 8/1984 | Wittren | .................... | B62D 5/09 137/111 |
| 4,827,972 A * | 5/1989 | Graham | ................ | F16K 11/105 137/512 |
| 6,446,656 B1 * | 9/2002 | Franks | ................. | F16K 11/048 137/112 |
| 7,051,512 B2 * | 5/2006 | Christensen | ............. | F02K 1/44 137/832 |
| 7,159,605 B2 * | 1/2007 | Thrash, Jr. | .............. | F16K 3/265 137/112 |
| 7,740,023 B2 * | 6/2010 | Zweber | ................ | F16K 11/105 137/1 |
| 8,171,951 B2 * | 5/2012 | Quendt | ................ | F16K 11/044 137/111 |
| 2006/0266414 A1 | 11/2006 | Baraga et al. | | |

\* cited by examiner

SPOOL SWITCHING VALVE DEVICE

CROSS REFERENCE TO RELATED APPLICATION

The present invention claims priority under 35 U.S.C. §119 to Japanese Application No. 2015-007899 filed Jan. 19, 2015, the entire content of which is incorporated herein by reference.

FIELD OF THE DISCLOSURE

The present disclosure relates to a spool switching valve device.

DESCRIPTION OF THE RELATED ART

In an automatic transmission or other elements of a car, provided is a switching structure of hydraulic circuits (for example, Japanese Patent Application Laid-open Publication No. S63-038775). In the switching structure described in the publication, a structure formed of one output port per two input ports is provided as a set, and one longitudinal side thereof is provided to a bottomed cylindrically shaped housing. Inside the housing, a pair of pistons at one end and the other end and an accommodation portion are provided. The pair of pistons includes a pair of valve bodies at the one end and the other end and a pair of valve seats for the respective valve bodies. The accommodation portion accommodates the valve bodies and the pistons. When a hydraulic pressure of one input port side is higher than a hydraulic pressure of the other input port side the piston moves toward the other port side. When the piston moves, the valve seat on the other end contacts the valve body on the other input port side, and thereby closes a flow path on the other input port side. Oil introduced through the one input port is directed to the output port through a flow path inside the housing.

However, when assembling the switching valve according to the conventional structure described above, it is necessary to insert and build up various members such as valve bodies, pistons, springs, bars, and the like, through an opening of the housing in a predetermined order. For this reason, it is required for a worker or others to be skilled for the assembly work, so that there may be a problem in workability. Further, in case of installing a plurality of switching valves, the concern in workability arises much more.

SUMMARY OF THE DISCLOSURE

One aspect of the present disclosure is a spool switching valve device, which comprises: a spool housing that has a columnar shape, includes hollow cavities which are drilled toward the center from both axial ends along an axial direction, which is a longitudinal direction of the spool housing; and valve bodies having a spherical shape which are respectively arranged within the hollow cavities. The spool housing including: first input port cavity portions, each of which is provided on the innermost side of each of the hollow cavities and penetrates to a side surface of the spool housing to communicate with outside of the spool housing; valve body movable portions, each of which is provided adjacent to each of the first input port cavity portions of the hollow cavities and accommodates each of the valve bodies to be movable in the axial direction; first valve seat portions, each of which is provided to each of boundary areas between the valve body movable portions and the first input port cavity portions and at which each of paths between the valve body movable portions and the first input port cavity portions is opened and closed by each of the valve bodies; and valve seat mounting portions, each of which is provided adjacent to each of the valve body movable portions at the foremost end of each of the hollow cavities and is provided with a valve seat member including a second valve seat portion. Each valve seat member has a tubular shape with a through hole at the center thereof and includes a second input port portion, which serves as a passage to the outside, disposed at an end portion of the through hole on the opposite side from the valve body movable portion. The second valve seat portion is provided to open and close a path between the valve body movable portion and the second input port portion, with the valve body being fitted into the valve body movable portion side of the through hole. Each valve body movable portion includes an output port which is provided at the center of a movable range of the valve body and penetrates into the side surface of the spool housing to communicate with the outside of the spool housing. Each valve seat mounting portion includes an engagement receiving portion which suppresses the detachment of the valve seat member when mounted to the valve seat member. Each valve seat member includes an engagement portion which is fitted into the engagement receiving portion when the valve seat member is mounted to the valve seat mounting portion.

The above and other elements, features, steps, characteristics and advantages of the present disclosure will become more apparent from the following detailed description of the preferred embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Figure 1:
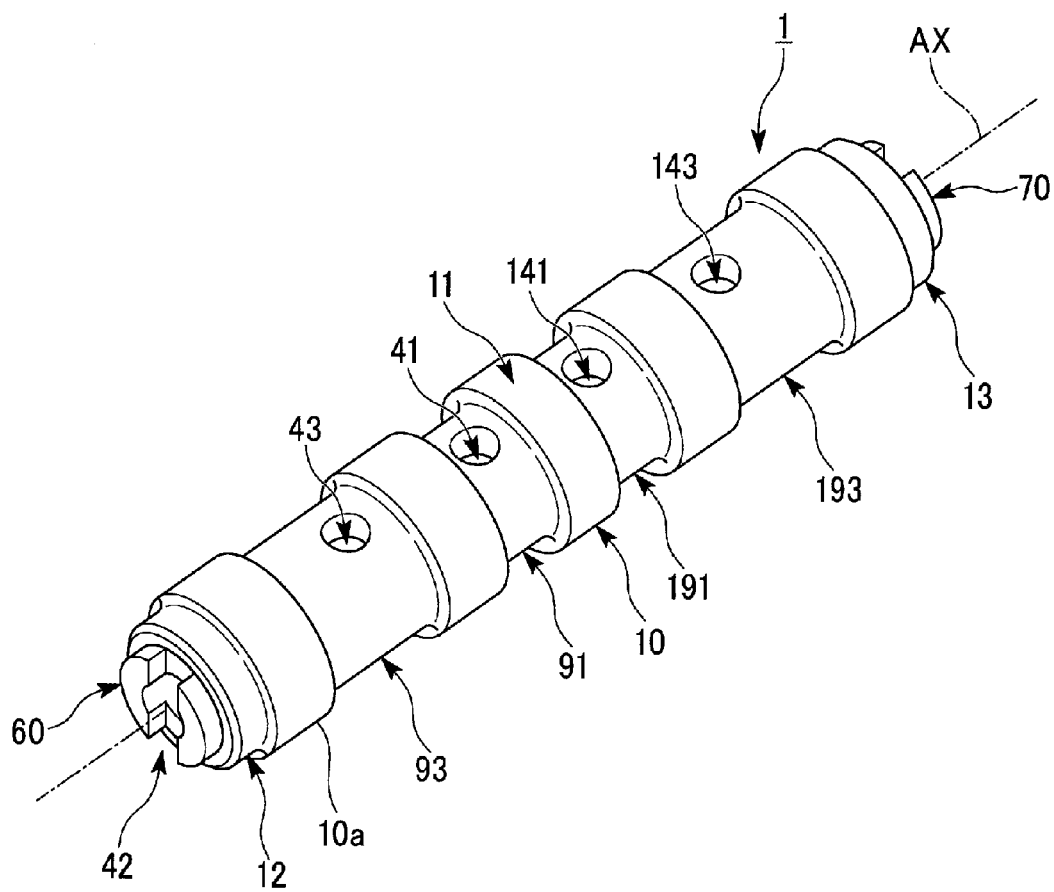
FIG. 1 is an external perspective view of a spool switching valve device according to one preferred embodiment of the present disclosure.

Hereinafter, a spool switching valve device according to a preferred embodiment of the present disclosure will be described with reference to FIG. 1 to FIG. 6. FIG. 1 is of an external perspective view of a spool switching valve device 1.

In the drawings, an X-Y-Z coordinate system is provided as an appropriate three-dimensional orthogonal coordinate system. An X-axis direction is a length direction of the cylindrical shaped spool switching valve device 1 shown in FIG. 1 and is parallel to an axial AX direction along a direction in which hollow cavities 20 and 30, which will be described in more detail in a subsequent section, extend. A Z-axis direction is a direction in which first input ports 41 and 141, second input ports 42 and 142, and output ports 43 and 143, which will be described in more detail in a subsequent section, extend centered at an axis AX. A Y-axis direction is a direction orthogonal to the Z-axis direction and the Y-axis direction.

Figure 2:
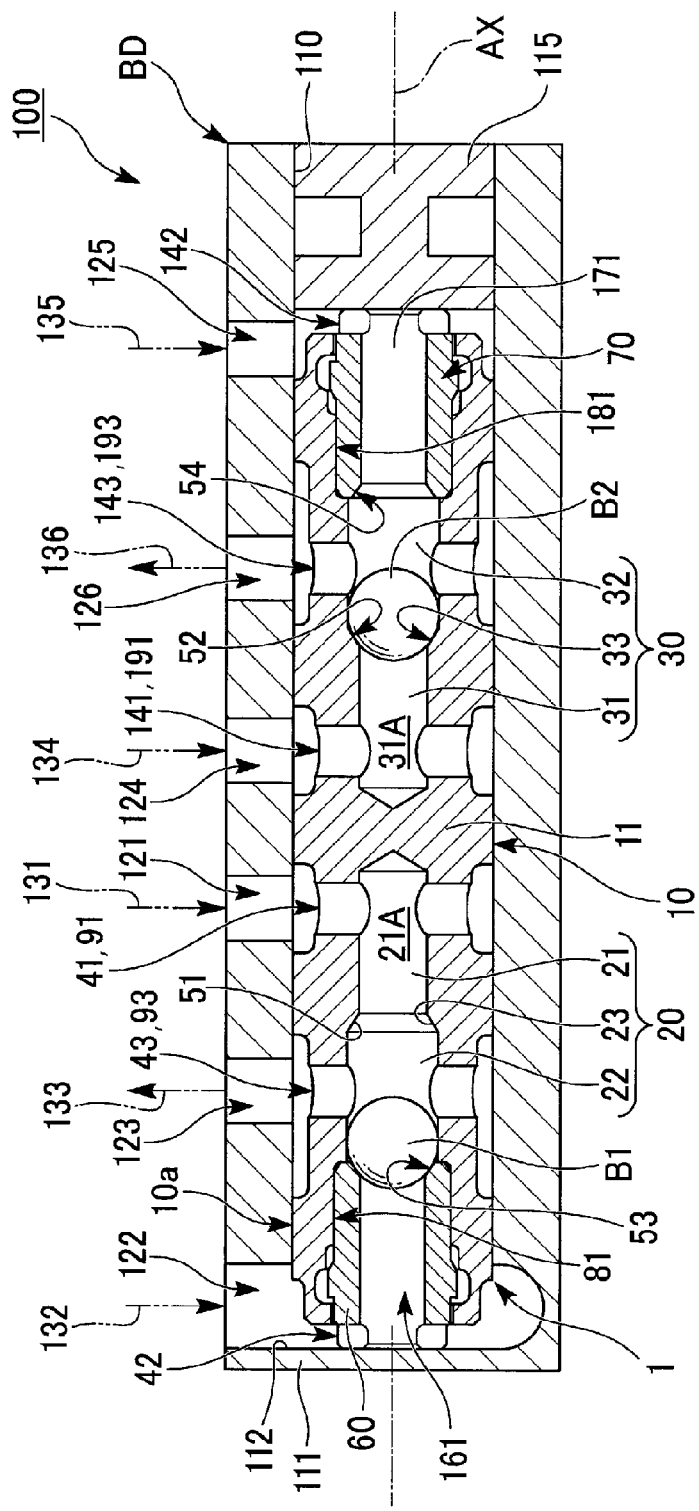
FIG. 2 is a cross-sectional view in a Z-X plane of a switching unit in which the spool switching device is provided.

FIG. 2 is a cross-sectional view taken along a Z-X plane, illustrating a switching unit 100 including a body BD, in which the spool switching valve device 1 is provided.

The spool switching valve device 1 includes a spool housing 10, valve seat members 60 and 70, and valve bodies B1 and B2. The valve bodies B1 and B2 have a spherical shape.

Figure 3:
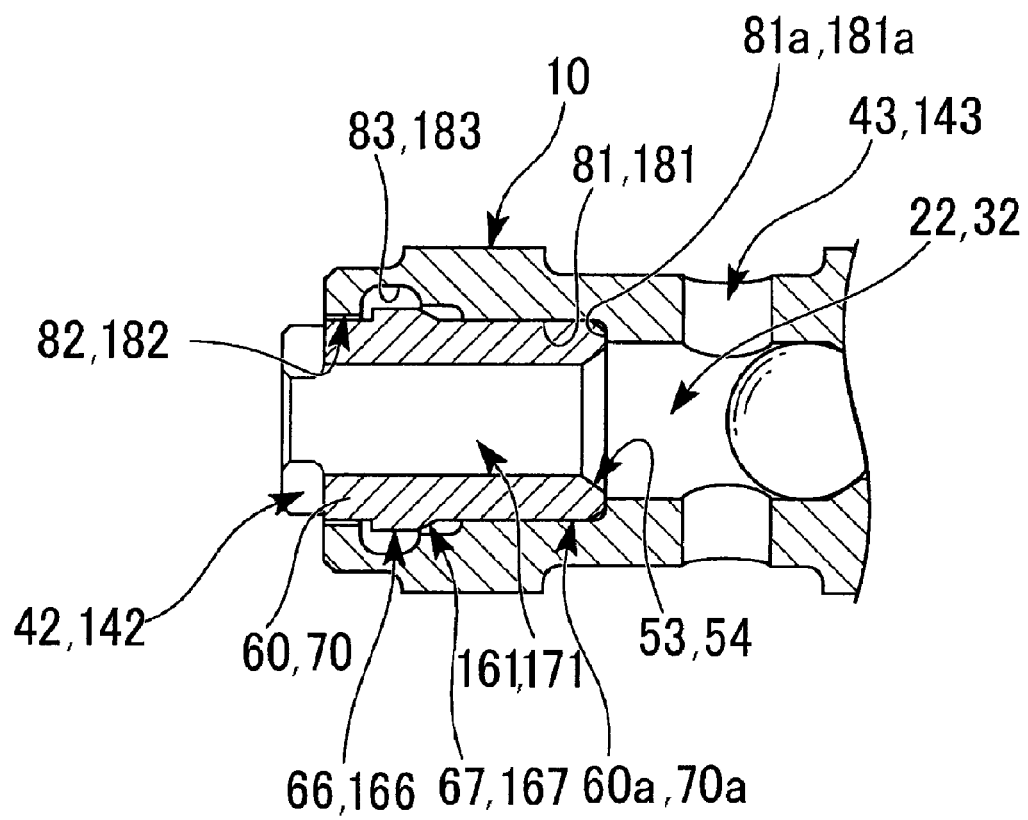
FIG. 3 is a partially enlarged view illustrating a vicinity of a −X side end of the spool housing.
Figure 4:
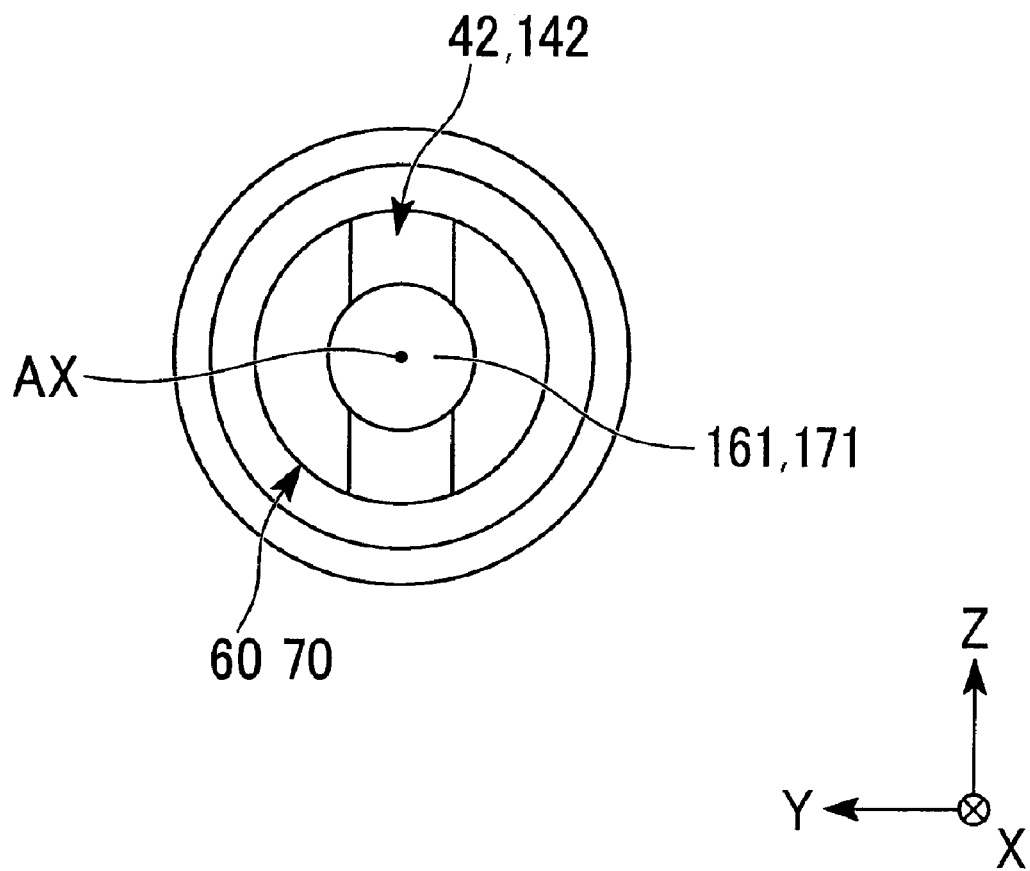
FIG. 4 is a diagram viewed from a vicinity of a −X side of the spool switching valve device.
Figure 5:
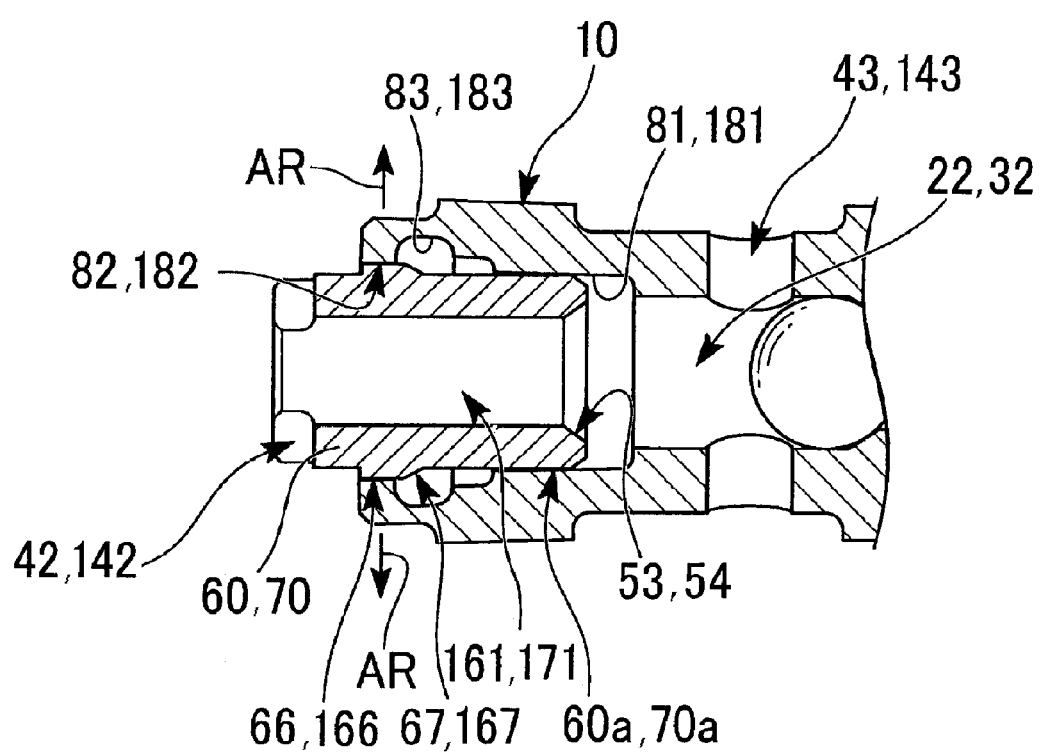
FIG. 5 is a partially enlarged view illustrating the vicinity of the −X side end of the spool housing.

The spool housing 10 has a cylindrical shape or substantially cylindrical shape. The spool housing 10 preferably includes hollow cavities 20 and 30 which are coaxially drilled toward the X-axial center from both X-axial ends along the X-axis direction. The hollow cavity 20 may be separated from the hollow cavity 30 in the X-axis direction by a separating wall 11 provided at the X-axial center of the spool housing 10. FIG. 3 is a partially enlarged view closed in the vicinity of a −X side end portion of the spool housing 10. Further, configurations of the hollow cavity 30 and the valve seat member 70 provided in the vicinity of a +X side end portion of the spool housing 10 are respectively the same as those of the hollow cavity 20 and the valve seat member 60. In FIG. 3 and FIG. 4, reference numbers of components included in the hollow cavity 30 and the valve seat member 70 are given in a similar manner as reference numbers of the components of the hollow cavity 20 and the valve seat member 60.

The hollow cavity 20 preferably includes a first input port cavity portion 21, a valve body movable portion 22, a first valve seat portion 23, a valve seat mounting portion 81, an engagement receiving portion 83 and an insert opening 82. The hollow cavity 30 includes a first input port cavity portion 31, a valve body movable portion 32, a first valve seat portion 33, a valve seat mounting portion 181, an engagement receiving portion 183 and an insert opening 182. That is, the spool housing 10 preferably includes the first input port cavity portions 21 and 31, the valve body movable portions 22 and 32, the first valve seat portion 23 and 33, the valve seat mounting portions 81 and 181, the engagement receiving portions 83 and 183, and the insert openings 82 and 182.

The first input port cavity portion 21 is provided on the innermost side of the hollow cavity 20. The first input port cavity portion 21 penetrates to a side surface of the spool housing 10 and communicates with the outside of the spool housing 10. The first input port cavity portion 21 has a cavity portion 21A extended in the X-axis direction, and a first input port 41 extended in the Z-axis direction. The cross section of the cavity portion 21A has a round shape or substantially round shape, and a diameter of the cavity portion 21A is smaller than that of the valve body B1. The first input port 41 connects the cavity portion 21A to the outside of the spool housing 10.

The valve body movable portion 22 is provided adjacent to a −X side of the first input port cavity portion 21. The valve body movable portion 22 extends in the X-axis direction, and accommodates the valve body B1 so as to be movable in the axis AX direction. The cross section of the valve body movable portion 22 has a round shape or substantially round shape, and a diameter of the valve body movable portion 22 is longer than that of the valve body B1.

The valve body movable portion 22 preferably includes the output port 43. The output port 43 is provided at the center of a movable range of the valve body B1 in the X-axis direction. The output port 43 penetrates the side surface of the spool housing 10 and communicates with the outside of the spool housing 10. The output port 43 is extended in the Z-axis direction and connects the valve body movable portion 22 to the outside of the spool housing 10.

The first valve seat portion 23 is provided to a boundary area between the valve body movable portion 22 and the first input port cavity portion 21. The first valve seat portion 23 preferably includes an inclined surface 51 which expands gradually toward the −X side. More specifically, a distance between the inclined surface 51 and the axis AX in the Z-axis direction is increased gradually toward the −X side. The inclined surface 51 is inclined, for example, at an angle of 45 degrees relative to the axis AX. In the first valve seat portion 23, a path between the valve body movable portion 22 and the first input port cavity portion 21 is opened and closed depending on whether or not the valve body B1 contacts the first valve seat portion 23.

The valve seat mounting portion 81 is provided at the foremost end portion of the hollow cavity 20, adjacent to the −X side of the valve body movable portion 22. The valve seat mounting portion 81 is extended in the X-axis direction. On the valve seat mounting portion 81, the valve seat member 60 is provided. The cross section of the valve seat mounting portion 81 has a round shape or substantially round shape, and a diameter of the valve seat mounting portion 81 is longer than that of the valve body movable portion 22. The valve seat mounting portion 81 is provided with a stepped portion 81a where the innermost side of the valve seat member 60 is abutted on. A depth between the stepped portion 81a and the valve seat mounting portion 81 is shorter than a length of the valve seat member 60.

The engagement receiving portion 83 is a concave portion provided onto the valve seat mounting portion 81. The engagement receiving portion 83 is provided on a farther −X side than the valve seat mounting portion 81. The engagement receiving portion 83 is a circumferential groove having its center on the axis AX. When the valve seat member 60 is mounted on the valve seat mounting portion 81, the engagement receiving portion 83 suppresses the valve seat member 60 from falling out of the valve seat mounting portion 81.

The insert opening 82 is provided to the −X side end of the spool housing 10 and has a cross section of a round shape or substantially round shape. A diameter of the insert opening 82 is longer than that of the valve seat mounting portion 81, and shorter than that of a bottom of the engagement receiving portion 83.

The first input port cavity portion 31 is provided on the innermost side of the hollow cavity 30. The first input port cavity portion 31 penetrates to the side surface of the spool housing 10 and communicates with the outside of the spool housing 10. The first input port cavity portion 31 has a cavity portion 31A extended in the X-axis direction and a first input port 141 extended in the Z-axis direction. The cross section of the cavity portion 31A has a round shape or substantially round shape, and a diameter of the cavity portion 31A is shorter than that of the valve body B2. The first input port 141 connects the cavity portion 31A to the outside of the spool housing 10.

The valve body movable portion 32 is provided adjacent to a +X side of the first input port cavity portion 31. The valve body movable portion 32 extends in the X-axis direction, and accommodates the valve body B2 so as to be movable in the axis AX direction. The cross section of the valve body movable portion 32 has a round shape or substantially round shape, and a diameter of the valve body movable portion 32 is longer than that of the valve body B2. The valve body movable portion 32 includes the output port 143. The output port 143 is provided at the center of a movable range of the valve body B2 in the X-axis direction. The output port 143 penetrates the side surface of the spool housing 10 and communicates with the outside of the spool housing 10. The output port 143 is extended in the Z-axis direction and connects the valve body movable portion 32 to the outside of the spool housing 10.

The first valve seat portion 33 is provided to a boundary area between the valve body movable portion 32 and the first input port cavity portion 31. Further, the first valve seat portion 33 includes an inclined surface 52 which gradually expands toward the +X side. More specifically, a distance between the inclined surface 52 and the axis AX in the Z-axis direction is increased gradually toward the +X side. The inclined surface 52 is inclined, for example, at an angle of 45 degrees relative to the axis AX. In the first valve seat portion 33, a path between the valve body movable portion 32 and the first input port cavity portion 31 is opened and closed depending on whether or not the valve body B2 contacts the first valve seat portion 33.

The valve seat mounting portion 181 is provided at a foremost end portion of the hollow cavity, adjacent to the +X side of the valve body movable portion 32. Further, the valve seat mounting portion 181 is extended in the X-axis direction. On the valve seat mounting portion 181, the valve seat member 70 is provided. The cross section of the valve seat mounting portion 181 has a round shape or substantially round shape, and a diameter of the valve seat mounting portion 181 is longer than that of the valve body movable portion 32. The valve seat mounting portion 181 is provided with a stepped portion 181a where the innermost side of the valve seat member 60 is abutted on. A depth between the stepped portion 181a and the valve seat mounting portion 181 is shorter than a length of the valve seat member 70.

The engagement receiving portion 183 is a concave portion provided onto the valve seat mounting portion 181. The engagement receiving portion 183 is provided on a farther +X side than the valve seat mounting portion 181. The engagement receiving portion 183 is a circumferential groove having its center on the axis AX. When the valve seat member 70 is mounted on the valve seat mounting portion 181, the engagement receiving portion 183 suppresses the valve seat member 70 from falling out of the valve seat mounting portion 181.

The insert opening 182 is provided to the +X side end of the spool housing 10 and has a cross section of a round shape or substantially round shape. A diameter of the insert opening 182 is longer than that of the valve seat mounting portion 181, and shorter than that of a bottom of the engagement receiving portion 183.

An annular groove portion 91, which extends in the circumferential direction, is provided on an outer circumferential surface 10a of the spool housing 10, where the first input port 41 is provided in the X-axis direction. The first input port 41 is open toward the groove portion 91. An annular groove portion 93, which extends in the circumferential direction, is provided on an outer circumferential surface 10a of the spool housing 10, where the output port 43 is provided in the X-axis direction. The output port 43 is open toward the groove portion 93. An annular groove portion 191, which extends in the circumferential direction, is provided on an outer circumferential surface 10a of the spool housing 10, where the first input port 141 is provided in the X-axis direction. The first input port 141 is open toward the groove portion 191. An annular groove portion 193, which extends in the circumferential direction, is provided on an outer circumferential surface 10a of the spool housing 10, where the output port 143 is provided in the X-axis direction. The output port 143 is open toward the groove 193.

The valve seat member 60 has a cylindrical shape or substantially cylindrical shape and has a through hole 161 at the center thereof, and is extended in the axis AX direction. The valve seat member 60 preferably includes the second input port portion 42, which serves as a passage to the outside, disposed at an end portion of the through hole 161 on the opposite side from the valve body movable portion 22. When the valve seat member 60 is mounted on the valve seat mounting portion 81 of the spool housing 10, and a leading end on the valve body movable portion 22 side abuts on the stepped portion 81a, the second input port portion 42 is provided to a site where the valve seat member 60 protrudes from the −X side end portion of the valve seat mounting portion 81. As illustrated in FIG. 4, the second input port portion 42 preferably includes a groove portion which extends in the Z-axis direction, perpendicularly to the axis AX. In the valve sheet member 60, a second valve seat portion 53 is disposed on the valve body movable portion 22 side of the through hole 161. The second valve seat portion 53 is inclined, and an inner diameter thereof expands gradually toward the +X side. The second valve seat portion 53 is inclined, for example, at an angle of 45 degrees relative to the axis AX. In the second valve seat portion 53, the valve body B1 is fitted thereto, and a path between the valve body movable portion 22 and the second input port portion 42 is opened and closed by this valve body B1.

The valve seat member 60 preferably includes an engagement portion 66, which enters into the engagement receiving portion 83 when the valve seat member 60 is mounted on the valve seat mounting portion 81. The engagement portion 66 is a convex portion which is provided on an outer circumferential surface 60a of the valve seat member 60. The engagement portion 66 is a ridge extending in the circumferential direction about the axis AX. An outer diameter of an outermost surface of the engagement portion 66 in a diameter direction orthogonal to the axis AX is longer than a diameter of the insert opening 82. The engagement portion 66 preferably includes a taper surface 67 having a tapered shape or substantially tapered shape toward the +X side of the convex portion. The taper surface 67 connects the outermost surface of the convex portion in the diameter direction orthogonal to the axis AX with the outer circumferential surface 60a of the valve seat member 60.

The valve seat member 70 has a cylindrical shape or substantially cylindrical shape and has a through hole 171 at the center thereof, and extends in the axis AX direction. The valve seat member 70 preferably includes the second input port portion 142, which serves as a passage to the outside, disposed to an end portion of the through hole 161 on the opposite side from the valve body movable portion 32. When the valve seat member 70 is mounted on the valve seat mounting portion 181 of the spool housing 10, and a leading end on the valve body movable portion 32 side abuts on the stepped portion 181a, the second input port portion 142 is provided to a site where the valve seat member 70 protrudes from the +X side end of the valve seat mounting portion 181. The second input port portion 142 preferably includes a groove portion extended in the Z-axis direction, perpendicularly to the axis AX. In the valve seat member 70, a second valve seat portion 54 is provided on the valve body movable portion 32 side in the through hole 171. The second valve seat portion 54 is inclined, and an inner diameter thereof expands gradually toward the −X side. The second valve seat portion 54 is inclined, for example, at an angle of 45 degrees relative to the axis AX. In the second valve seat portion 54, the valve body B2 is provided, and a path between the valve body movable portion 32 and the second input port portion 142 is opened and closed by this valve body B2.

The valve seat member 70 includes an engagement portion 166, which enters into the engagement receiving portion 183 when the valve seat member 70 is mounted on the valve seat mounting portion 181. The engagement portion 166 is a convex portion provided on an outer circumferential surface 70a of the valve seat member 70. The engagement portion 166 is a ridge extending in the circumferential direction about the axis AX. An outer diameter of an outermost surface of the engagement portion 166 in a diameter direction orthogonal to the axis AX is longer than a diameter of the insert opening 182. The engagement portion 166 preferably includes a taper surface 167 having a tapered shape or substantially tapered shape toward the −X side of the convex portion. The taper surface 167 connects the outermost surface of the convex portion in the diameter direction orthogonal to the axis AX with the outer circumferential surface 70a of the valve seat member 70.

As illustrated in FIG. 2, the body BD has a tubular or substantially tubular shape, and has a cavity portion 110 extended in the X-axis direction from the +X side end portion. A bottom portion 111 of the cavity portion 110 preferably includes a bottom surface 112 which is parallel to a ZY plane. The spool switching valve device 1 is inserted into the cavity portion 110 from the +X side end portion. A length of the cavity portion 110 in the X-axis direction is longer than a total length of the spool switching valve device 1. The outer circumferential surface of the spool housing 10 can be fitted into an inner circumferential surface of the cavity portion 110. A plug 115 is inserted into the cavity portion 110 in the +X side to be located behind the spool switching valve device 1 in the X-axis direction. An outer circumferential surface of the plug 115 can be fitted into the inner circumferential surface of the cavity portion 110. A path between the outer circumferential surface of the plug 115 and the inner circumferential surface of the cavity portion 110 is preferably provided with a sealant, although it is not illustrated in the drawings. The sealant can be, for example, an O-ring.

The body BD preferably includes connection openings 121, 122, 123, 124, 125 and 126 which connect the cavity portion 110 to the outside of the body BD. Each of the connection openings 121, 122, 123, 124, 125 and 126 is extended in a direction orthogonal to the axis AX. The connection opening 121 is provided to the same X-axial as and axial AX circumferential position to the first input port 41. The connection opening 122 is provided to the same X-axial as and axial AX circumferential position to the second input port 42. The connection opening 123 is provided to the same X-axial as and axial AX circumferential position to the output port 43. The connection opening 124 is provided to the same X-axial as and axial AX circumferential position to the first input port 141. The connection opening 125 is provided to the same X-axial as and axial AX circumferential position to the second input port 142. The connection opening 126 is provided to the same X-axial as and axial AX circumferential position to the output port 143.

Liquid, such as oil or automatic transmission fluid (hereinafter, referred to as "oil"), is directed into the connection opening 121 through a first inlet portion 131. Oil is directed into the connection opening 122 through a second inlet portion 132. Oil in the valve body movable portion 22 is discharged from a first outlet portion 133 through the connection opening 123. Oil is directed into the connection opening 124 through a third inlet portion 134. Oil is directed into the connection opening 125 through a fourth inlet portion 135. Oil in the valve body movable portion 22 is discharged from a second outlet portion 136 through the connection opening 126.

Herein, the assembly of the spool changeover valve device 1 will be described. When assembling the spool changeover valve device 1, first, the valve body B1 is preferably accommodated in the valve body movable portion 22 of the spool housing 10. Then, the valve seat member 60 is mounted on the −X side end of the spool housing 10 which accommodates the valve body B1. Next, the valve body B2 is accommodated in the valve body movable portion 32 of the spool housing 10. The valve seat member 70 is mounted on the +X side end of the spool housing 10 which accommodates the valve body B2.

The steps of accommodating the valve body B1 in the valve body movable portion 22, and mounting the valve seat member 60 on the spool housing 10 are preferably performed in a state where the spool housing 10 is retained along a vertical direction such that the insert opening 82 faces upward. The valve body B1, which is accommodated in the valve body movable portion 22, is seated in the first valve seat portion 23 by its own weight. With this, the step of mounting the valve seat member 60 on the spool housing 10 can be performed smoothly. The steps of accommodating the valve body B2 in the valve body movable portion 32, and mounting the valve seat member 70 on the spool housing 10 are preferably performed in a state where the spool housing 10 is retained along a vertical direction such that the insert opening 82 faces upward. The valve body B2 accommodated in the valve body movable portion 32 is seated in the first valve seat portion 33 by its own weight. With this, the step of mounting the valve seat member 70 on the spool housing 10 can be performed smoothly.

When a worker or others perform(s) the step of mounting the valve seat member 60 onto the valve seat mounting portion 81 of the spool housing 10, a +X side leading end of the valve seat member 60 is inserted from the insert opening 82. When the insertion of the valve seat member 60 into the valve seat mounting portion 81 proceeds, the insert opening 82 of the spool housing 10 is gradually widened radially outward, that is, in the direction shown with an arrow AR in FIG. 5, by the taper surface 67 of the valve seat member 60. In the spool housing 10, a thickness between the outer circumferential surface thereof and the engagement receiving portion 83 is smaller than a thickness of the surrounding portions. Therefore, starting from this thin portion, the insert opening 82 is elastically deformed radially outward. In other words, an inner surface, which forms the insert opening 82, is elastically deformed, so that the insert opening 82 is widened radially outward, thereby increasing the diameter of the insert opening 82. When the insertion of the valve seat member 60 into the valve seat mounting portion 81 proceeds further and the engagement portion 66 passes through the insert opening 82, the engagement portion 66 is fitted into the engagement receiving portion 83. When the engagement portion 66 is fitted into the engagement receiving portion 83, the diameter of the insert opening 82 is restored. A leading end of the valve seat member 60 contacts the stepped portion 81a, and then, the valve seat member 60 is provided to the spool housing 10. In the engagement portion 66, an outer diameter of the outermost surface in the radial direction is longer than the diameter of the insert opening 82. Therefore, the engagement portion 66 is suppressed from moving toward the −X side, which, in result, suppresses the valve seat member 60 from falling out of the spool housing 10.

When a worker or others perform(s) the step of mounting the valve seat member 70 onto the valve seat mounting portion 181 of the spool housing 10, a −X side leading end of the valve seat member 70 is inserted from the insert opening 182. When the insertion of the valve seat member 70 into the valve seat mounting portion 181 proceeds, the insert opening 182 of the spool housing 10 is gradually widened radially outward by the taper surface 167 of the valve seat member 70. In the spool housing 10, a thickness between the outer circumferential surface thereof and the engagement receiving portion 183 is smaller than a thickness of the surrounding portions. Therefore, starting from this thin portion, the insert opening 182 is elastically deformed radially outward. In other words, an inner surface, which forms the insert opening 182, is elastically deformed, so that the insert opening 182 is widened radially outward, thereby increasing the diameter of the insert opening 182. When the insertion of the valve seat member 70 into the valve seat mounting portion 181 proceeds further and the engagement portion 166 passes through the insert opening 182, the engagement portion 166 is fitted into the engagement receiving portion 183. When the engagement portion 166 is fitted to the engagement receiving portion 183, the diameter of the insert opening 182 returns to its original one. A leading end of the valve seat member 70 contacts the stepped portion 181a, and then, the valve seat member 70 is provided to the spool housing 10. In the engagement portion 166, an outer diameter of the outermost surface thereof in the radial direction is longer than the diameter of the insert opening 182. Therefore, the engagement portion 166 is suppressed from moving toward the +X side, so that the valve seat member 70 is suppressed from falling out of the spool housing 10.

When the spool switching valve device 1 is assembled, a worker or others inserts the spool switching valve device 1 into the cavity portion 110 of the body BD, as shown in FIG. 2. When the worker or others inserts the spool switching valve device 1 into the cavity portion 110 of the body BD, the plug 115 is inserted into the cavity portion 110 to seal the cavity portion 110. By inserting the spool switching valve device 1 and the plug 115 into the cavity portion 110 of the body BD, the switching unit 100 is assembled.

In the switching unit 100, the oil introduced from the first inlet portion 131 at a first hydraulic pressure flows through the connection opening 121, the groove portion 91, the first input port 41 and the cavity portion 21A in said order and is directed into the valve body movable portion 22. The oil introduced from a second inlet portion 132 at a second hydraulic pressure flows through the connection opening 122, the second input port portion 42 and the through hole 161 in said order and is directed into the valve body movable portion 22. In the switching unit 100, the oil introduced from the third inlet portion 134 at a third hydraulic pressure flows through the connection opening 124, the groove portion 191, the first input port 141 and the cavity portion 31A in said order and flows into the valve body movable portion 32. The oil introduced from the fourth inlet portion 135 at a fourth hydraulic pressure flows through the connection opening 125, the second input port portion 142 and the through hole 171 in said order and flows into the valve body movable portion 32.

For example, when the first hydraulic pressure of the oil introduced from the first input port 41 is higher than the second hydraulic pressure of the oil introduced from the second input port portion 42, the valve body B1 is moved to the −X side and fitted into the second valve seat portion 53 due to a pressure difference between the first hydraulic pressure and the second hydraulic pressure. When the valve body B1 is fitted into the second valve seat portion 53, a path between the second input port portion 42 and the valve body movable portion 22 is closed. Accordingly, an oil path can be selected where the oil path guides the oil introduced from the first inlet portion 131 into the valve body movable portion 22 to flow through the output port 43, the groove portion 93 and the connection opening 123, in said order, and is discharged through the first outlet portion 133. When the second hydraulic pressure is higher than the first hydraulic pressure, the valve body B1 is moved to the +X side and fitted into the first valve seat portion 23 due to a pressure difference between the first hydraulic pressure and the second hydraulic pressure. When the valve body B1 is moved and fitted into the first valve seat portion 23, a path between the first input port cavity portion 21 and the valve body movable portion 22 is closed. Accordingly, an oil path can be selected, where the oil path guides the oil introduced from the second inlet portion 132 into the valve body movable portion 22 to flow through the output port 43, the groove portion 93 and the connection opening 123, in said order, and is discharged through the first outlet portion 133.

For example, when the third hydraulic pressure of the oil introduced from the first input port 141 is higher than the fourth hydraulic pressure of the oil introduced from the second input port portion 142, the valve body B2 is moved to the +X side and fitted into the second valve seat portion 54 due to a pressure difference between the third hydraulic pressure and the fourth hydraulic pressure. When the valve body B2 is moved out into the second valve seat portion 54, a gap between the second input port portion 142 and the valve body movable portion 32 is closed. Accordingly, an oil path can be selected, where the oil path guides the oil introduced from the third inlet portion 134 into the valve body movable portion 32 to flow through the output port 143, the groove portion 193 and the connection opening 126, in said order, and is discharged through the second outlet portion 136. When the fourth hydraulic pressure is higher than the third hydraulic pressure, the valve body B2 is moved to the −X side and fitted into the first valve seat portion 33 due to a pressure difference between the first hydraulic pressure and the second hydraulic pressure. When the valve body B2 is moved and fitted into the first valve seat portion 33, a gap between the first input port cavity portion 31 and the valve body movable portion 22 is closed. Accordingly, an oil path can be selected where the oil path guides the oil introduced from the fourth inlet portion 135 into the valve body movable portion 32 to flow through the output port 143, the groove portion 193 and the connection opening 126, in said order, and is discharged through the second outlet portion 136.

As described above, in this preferred embodiment, the assembly is completed by accommodating the valve body B1 in the hollow cavity 20 of the spool housing 10, accommodating the valve body B2 in the hollow cavity 30, and mounting the valve seat members 60 and 70 to the spool housing 10. With this structure, it is possible to improve the assembling workability of the spool switching valve device 1. In this preferred embodiment, the engagement portion 66 of the valve seat member 60 is fitted into the engagement receiving portion 83 of the spool housing 10, and the engagement portion 166 of the valve seat member 70 is fitted into the engagement receiving portion 183 of the spool housing 10. Therefore, it is possible to easily suppress the detachment of the valve seat members 60 and 70. Further, the spool housing 10 preferably includes the taper surface 67 on the valve body movable portion 22 side of the engagement portion 66 of the valve seat member 60. The spool housing 10 preferably includes the taper surface 167 on the valve body movable portion 32 side of the engagement portion 166 of the valve seat member 70. For this reason, it is possible to widen the insert openings 82 and 182 easily when the engagement portion 66 is fitted into the engagement receiving portion 83 and the engagement portion 166 is fitted into the engagement receiving portion 183. Accordingly, in the spool switching valve device 1, it is possible to improve the workability in mounting the valve seat members 60 and 70 that are provided to the spool housing 10.

In this preferred embodiment, the valve bodies B1 and B2 are the only element that makes a movement in response to the switching of the oil paths. Therefore, it is possible to quickly change the oil paths, and further, achieve downsizing and weight-lightening of the spool switching valve device 1. The spool switching device 1 preferably includes the annular groove portions 91, 93, 191 and 193 on the outer circumferential surface of the spool housing 10. The first input port 41, the output port 93, the first input port 141 and the output port 193 are respectively open to the groove portions 91, 93, 191 and 193. Therefore, it is not necessary for the axial AX circumferential positions of the connection openings 121, 123, 124 and 126 of the body BD to correspond to the first input port 41, the output port 93, the first input port 141 and output port 193, respectively. Accordingly, it is possible to increase the degree of freedom in designing the body BD without limiting the axial AX circumferential positions of the connection openings 121, 123, 124 and 126.

Hereinabove, a preferred exemplary embodiment of the present disclosure has been described with reference to the accompanying drawings, however, the scope of the present disclosure is not limited thereto. The shapes of the respective members described above and the combinations described above are presented only as an example, and they may be arbitrarily altered within the technical spirit of the present disclosure.

As described above, the taper surfaces 67 and 167 are each provided to the far back sides of the engagement portions 66 and 166. Meanwhile, front sides of the engagement portions 66 and 166 may have tapered shapes. In a case in which the front sides of the engagement portions 66 and 166 have tapered shapes, it is possible to improve workability in detaching the valve seat members 60 and 70 from the spool housing 10, for example, when performing maintenance work.

In the preferred embodiment described above, the engagement portions 66 and 166 are illustrated as ridges extending in the circumferential direction. However, the engagement portions 66 and 166 may be ridges that are provided only partially in the circumferential direction. In other words, the engagement portions 66 and 166 may be a plurality of ridges arranged in the circumferential direction. When the ridges are only partially arranged in the circumferential direction, the engagement receiving portions 83 and 183 of the spool housing 10 may be provided only to positions at which the ridges of the engagement portions 66 and 166 are arranged.

Figure 6:
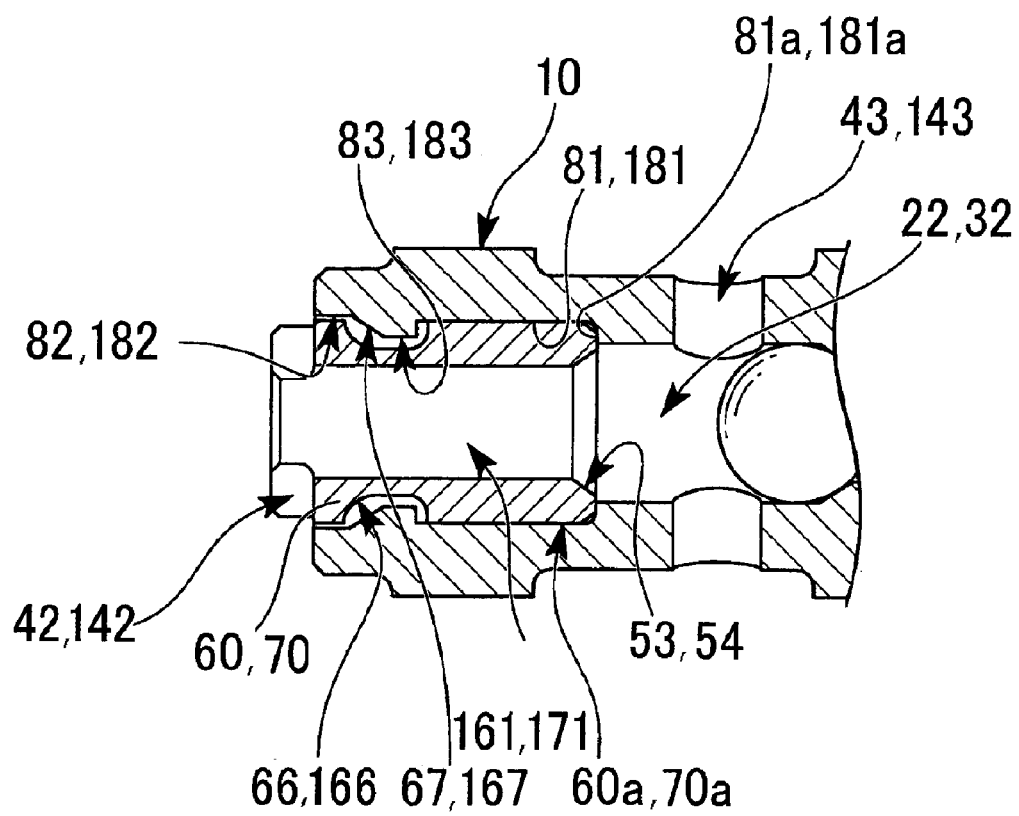
FIG. 6 is a partially enlarged view of a spool housing according to a modification example.

In the preferred embodiment described above, the engagement receiving portions 83 and 183 of the spool housing 10 are concave portions, and the engagement portion 66 of the valve seat member 60 and the engagement portion 166 of the valve seat member 70 are convex portions. Meanwhile, as illustrated in FIG. 6, the engagement receiving portions 83 and 183 of the spool housing 10 may be convex portions including ridges extending in the circumferential direction, and the engagement portion 66 of the valve seat member 60 and the engagement portion 166 of the valve seat member 70 may be concave portions having circumferential grooves. In this case, the taper surfaces 67 and 167 are preferably provided on the front side of the engagement receiving portions 83 and 183. By configuring the far back sides of the engagement receiving portions 83 and 183 in tapered shapes, it is possible to improve the workability in removing the valve seat members 60 and 70 from the spool housing 10.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present invention. The scope of the present disclosure, therefore, is to be determined solely by the following claims.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A spool switching valve device, comprising:
    a spool housing having a columnar shape, comprising hollow cavities which are drilled toward a center of the spool housing from axial ends along an axial direction, the axial direction being a longitudinal direction of the spool housing; and
    valve bodies having a spherical shape, which are respectively arranged within the hollow cavities,
    wherein the spool housing comprises:
        first input port cavity portions, each of which is provided on an innermost side of each of the hollow cavities, and penetrates to a side surface of the spool housing to communicate with outside of the spool housing;
        valve body movable portions, each of which is provided adjacent to each of the first input port cavity portions of the hollow cavities, and accommodates each of the valve bodies to be movable in the axial direction;
        first valve seat portions, each of which is provided to each of boundary areas between the valve body movable portions and the first input port cavity portions, and at which each of paths between the valve body movable portions and the first input port cavity portions is opened and closed by each of the valve bodies; and
        valve seat mounting portions, each of which is provided adjacent to each of the valve body movable portions at a foremost end of each of the hollow cavities, and is provided with a valve seat member including a second valve seat portion, each valve seat member has a tubular shape with a through hole at a center thereof and includes a second input port portion, which serves as a passage to the outside, disposed at an end portion of the through hole on an opposite side from the valve body movable portion, the second valve seat portion being provided to open and close a path between the valve body movable portion and the second input port portion, with the valve body being fitted into a valve body movable portion side of the through hole, each valve body movable portion comprises an output port which is provided at a center of a movable range of the valve body, and penetrates into the side surface of the spool housing to communicate with the outside of the spool housing, each valve seat mounting portion comprises an engagement receiving portion which suppresses detachment of the valve seat member when mounted to the valve seat member, and each valve seat member comprises an engagement portion which is fitted into the engagement receiving portion when the valve seat member is mounted to the valve seat mounting portion.

2. The spool switching valve device according to claim 1, wherein the engagement receiving portion is a concave portion, and the engagement portion is a convex portion which is fitted into the concave portion.

3. The spool switching valve device according to claim 2, wherein the concave portion is a groove extending in a circumferential direction, and the convex portion is a ridge extending in the circumferential direction.

4. The spool switching valve device according to claim 2, wherein an innermost side of the convex portion has a tapered shape.

5. The spool switching valve device according to claim 4, wherein a front side of the convex portion has a tapered shape.

6. The spool switching valve device according to claim 1, wherein the engagement portion is a concave portion, and the engagement receiving portion is a convex portion which is fitted into the concave portion.

7. The spool switching valve device according to claim 6, wherein the concave portion is a groove extending in the circumferential direction, and the convex portion is a convex article extending in the circumferential direction.

8. The spool switching valve device according to claim 6, wherein a front side of the convex portion has a tapered shape.

9. The spool switching valve device according to claim 8, wherein an innermost side of the convex portion has a tapered shape.

10. The spool switching valve device according to claim 1, wherein an outer circumferential surface of the spool housing includes a first groove portion which is extended in a circumferential direction and connected with the first input port cavity portion, and a second groove portion which is extended in the circumferential direction and connected with the output port.

* * * * *